Dec. 15, 1936.   H. W. BROWN   2,064,370
JACK
Filed Nov. 13, 1935
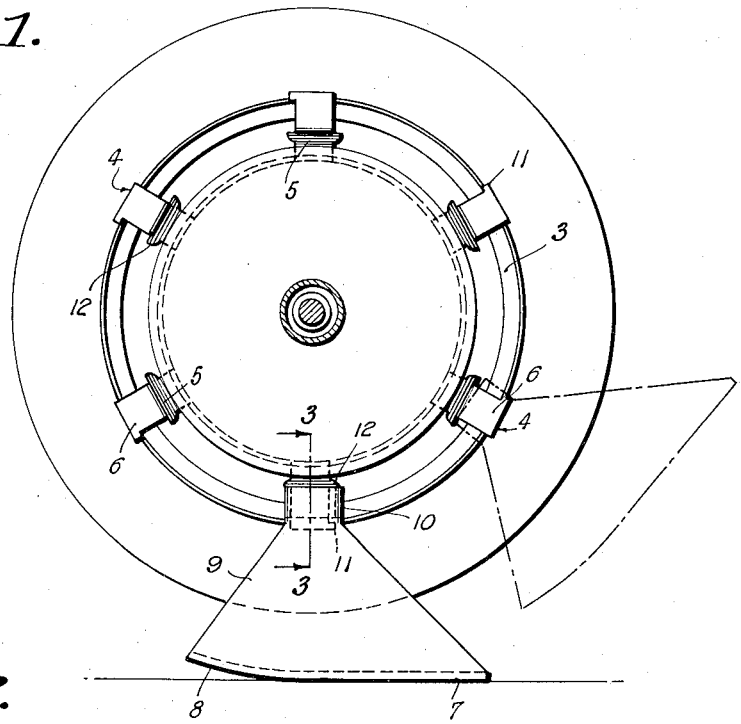
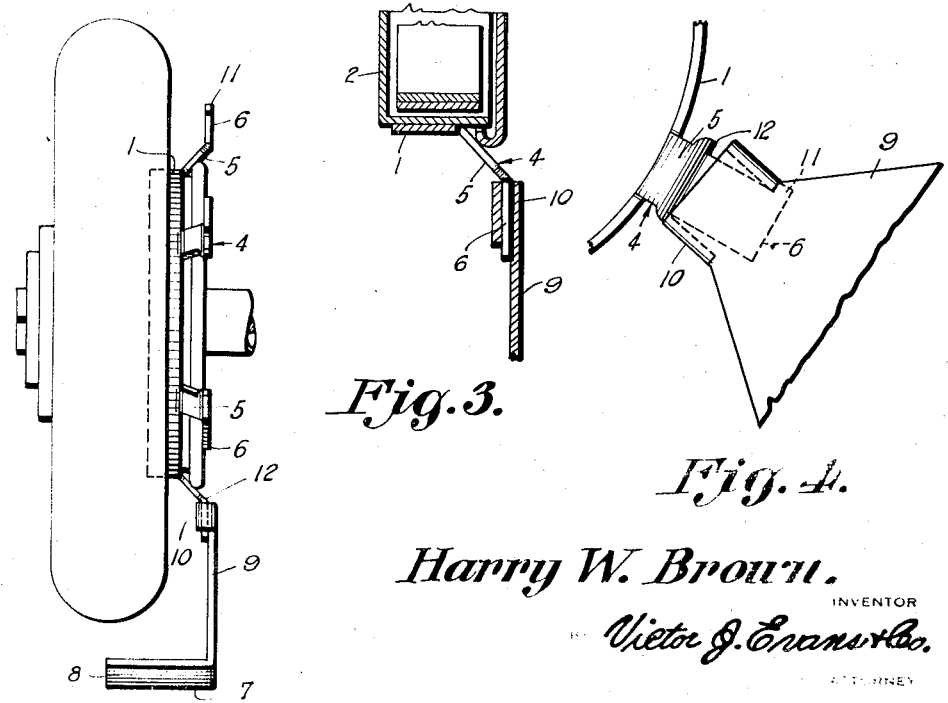
Harry W. Brown,
INVENTOR
Victor J. Evans & Co.
ATTORNEY Patented Dec. 15, 1936

2,064,370

UNITED STATES PATENT OFFICE 2,064,370

JACK

Harry Wallace Brown, Louisville, Colo.

Application November 13, 1935, Serial No. 49,619

1 Claim. (Cl. 254—94)

This invention relates to a wheel elevating device for motor vehicles, and has for the primary object the provision of a device of this character which will permit elevating a wheel to a desired height from the ground by the forward or backward movements of the motor vehicle and consists of units forming permanent parts of the motor vehicle wheel and a second unit or shoe which may be readily applied to any one of the wheel units so that during the rotation of the wheel, the shoe contacts the ground and brings about elevation of the wheel from the ground whereby repairs may be made thereto or to the tire of said wheel.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, showing my invention adapted to a motor vehicle wheel with the wheel supported in an elevated position by my invention.

Figure 2 is a fragmentary front elevation illustrating the same.

Figure 3 is a detail sectional view taken on the line 3—3 of Figure 1.

Figure 4 is a fragmentary side elevation showing the connection between the wheel unit and the shoe.

Referring in detail to the drawing, the numeral 1 indicates a band which may be shrunk on or otherwise secured to a brake drum of a motor vehicle wheel 3. Extending radially of the band 1 is a plurality of arms 4 arranged between the motor vehicle wheel 3 and the body or chassis of the motor vehicle and are so shaped as to not interfere with the usual brake rigging of the motor vehicle. Each arm includes angularly related portions 5 and 6 of integral formation and the portion 5 is integrally connected with the band 1. The band 1 and arms 4 form a unit of my invention and each wheel of the motor vehicle is equipped with one of these units.

The second unit of my invention consists of a shoe 7 having one end curved, as shown at 8, to prevent said end from digging into the ground when contacting therewith. Integral with the shoe 7 and extending at right angles thereto is an attaching plate 9 of substantially triangular shape, the apex portion of which is formed to provide a sleeve 10 adapted for application to any one of the arms of the wheel units of my invention. Each arm of the wheel unit has at its free end a lug 11 and also is provided with stops 12. The sleeve 10 when adapted to an arm 4 has a comparatively loose fit therewith and the sleeve is limited in its movement onto the arm beyond a predetermined distance by the stops 12, positioning the lug 11 slightly beyond the opposite end of the sleeve so that when the shoe or ground unit is adapted to an arm, as shown in dotted lines in Figure 1, and prior to engaging with the ground, it will be prevented from moving off of the arm by the lug 11. A motion of the motor vehicle either forwardly or rearwardly brings the shoe in contact with the ground and the elevation of the wheel, as shown in Figure 1, so that adjustments or repairs may be made to the wheel or the tire removed from the wheel for repair.

The shoe 7 or the tread portion thereof forms a toe and heel portion, the heel portion being of a greater length than the toe portion so that the heel portion will prevent the automobile from moving either forward or backward when supporting the latter.

The shoe when not in use forms a comparatively compact or small unit which may be readily stored within the motor vehicle and the wheel units due to their mounting to the wheels and construction will in no way interfere with the rotation of said wheel or other parts of the motor vehicle.

A device of the character described renders the elevating of a wheel of a motor vehicle comparatively easy and eliminates the use of the conventional type of jack.

Having described the invention, I claim:

A wheel elevating device comprising a band encircling and secured on a brake drum of a wheel, a plurality of radially arranged arms secured to said band, a shoe including a tread portion having one end curved laterally of said tread portion, a plate integral with said shoe and extending at right angles thereto, a sleeve integral with the plate and adaptable to receive any one of the arms, stops applied to each arm for limiting the movement of the sleeve on the arm in the direction of the band, said sleeve having a limited movement relative to the arm, and a lug formed on the arm to engage with one end of the sleeve.

HARRY WALLACE BROWN.